(12) United States Patent
Mori (10) Patent No.: US 8,194,167 B2
(45) Date of Patent: Jun. 5, 2012

(54) IMAGING APPARATUS AND DISPLAY CONTROL METHOD

(75) Inventor: Nobuyuki Mori, Osaka (JP)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 12/707,379

(22) Filed: Feb. 17, 2010

(65) Prior Publication Data

US 2010/0259666 A1   Oct. 14, 2010

(30) Foreign Application Priority Data

Apr. 13, 2009 (JP) ................. 2009-096986

(51) Int. Cl.
*H04N 5/222* (2006.01)
(52) U.S. Cl. ................. 348/333.13; 348/333.09
(58) Field of Classification Search .................. None
See application file for complete search history.

(56) References Cited

U.S. PATENT DOCUMENTS

| 5,603,068 | A * | 2/1997 | Aihara | 396/287 |
| 5,708,882 | A * | 1/1998 | Yokonuma et al. | 396/296 |
| 7,420,585 | B2 * | 9/2008 | Fredlund et al. | 348/61 |
| 7,738,025 | B2 * | 6/2010 | Nonaka | 348/333.13 |
| 7,940,321 | B2 * | 5/2011 | Sudo | 348/333.01 |

FOREIGN PATENT DOCUMENTS

JP   8-110564   4/1996

* cited by examiner

*Primary Examiner* — Luong T Nguyen
(74) *Attorney, Agent, or Firm* — Oblon, Spivak, McClelland, Maier & Neustadt, L.L.P.

(57) ABSTRACT

An imaging apparatus includes a photographic control device controlling a photographing behavior according to a photographing direction, a switching device switching an imaging apparatus between an active state and a low power state, an optical finder device introducing a subject light into a finder window along a predetermined light path, a transmissive display device, provided on the path, with a display screen switchable between a transmission state transmitting the subject light and a low transmission state, and a display control device controlling the transmittance between the transmission state and the low transmission state. The photographic control device has a photography prohibition device setting in a photography prohibited state not performing the photographing behavior even with the direction, and the display control device has a device putting a predetermined region in the screen into the low transmission state when the photography prohibited state is set in the low power state.

6 Claims, 7 Drawing Sheets

IMAGING APPARATUS AND DISPLAY CONTROL METHOD

BACKGROUND OF THE INVENTION

1. Field of the Invention

The present invention relates to a technique of imaging apparatuses provided with an optical finder.

2. Description of the Related Art

Digital single-lens reflex cameras and other imaging apparatuses often shift to a state in which when the power source is turned off by a power switch or a switchover to a power saving mode is made, immediate photographing is not allowed (photography is prohibited) even when a shutter button is operated. Since this photography prohibited state prevents immediate photographing from being carried out even when a user tries to take a photograph by looking into a finder window, photo opportunities are sometimes missed.

Imaging apparatuses are proposed that are provided with a transmissive liquid crystal panel on a light path of an optical finder and can carry out a superimposed indication in which indications, such as a focus detection region (AF area), are superimposed on a photographic subject image in the finder window upon taking a photograph by varying the transmittance (for example, refer to Japanese Unexamined Patent Application Publication No. 8-110564).

SUMMARY OF THE INVENTION

However, in the imaging apparatus in Japanese Unexamined Patent Application Publication No. 8-110564 above, although a user can appropriately recognize the AF area and the like upon taking a photograph by looking into the finder window while the power source is turned on, the user is not allowed to appropriately recognize that the apparatus is in a photography prohibited state while the apparatus is in the photography prohibited state when the power source is turned off. This may cause a possibility of missing a photo opportunity as described above.

It is desirable to provide a technique of an imaging apparatus that allows easy recognition of being in a photography prohibited state upon looking into a finder window.

An embodiment of the present invention is an imaging apparatus including a photographic control means for controlling a photographing behavior in accordance with an input of a direction for taking a photograph, a switching means for switching between an active state of an imaging apparatus and a low power state lower in power consumption than the active state, an optical finder means for introducing a photographic subject light entered via a photographic optical system into a finder window along a predetermined light path, a transmissive display means provided on the predetermined light path and having a display screen capable of switching between a transmission state that transmits the photographic subject light and a low transmission state lower in transmittance than in the transmission state, and a display control means for controlling the transmittance of the display screen between the transmission state and the low transmission state. The photographic control means has a photography prohibition means for setting in a photography prohibited state in which the photographing behavior is not performed even when the direction for taking a photograph is inputted, and the display control means has a means for putting a predetermined region in the display screen into the low transmission state in a case that the photography prohibited state is set in the low power state.

Another embodiment of the present invention is a display control method including the steps of controlling a photographing behavior in an imaging apparatus in accordance with an input of a direction for taking a photograph, switching between an active state of the imaging apparatus and a low power state lower in power consumption than in the active state, and controlling a display screen of a transmissive display means, which is provided on a light path of an optical finder means for introducing a photographic subject light entered via a photographic optical system into a finder window and is capable of switching between a transmission state that transmits the photographic subject light and a low transmission state lower in transmittance than in the transmission state, regarding the transmittance between the transmission state and the low transmission state. The photographic controlling has a step of prohibiting photography that sets in a photography prohibited state in which the photographing behavior is not performed even when the direction for taking a photograph is inputted, and the display controlling has a step of putting a predetermined region in the display screen into the low transmission state in a case of setting in the photography prohibited state in the low power state.

According to the embodiments of the present invention, in a low power state in which the power consumption is lower than in an active state, in a case that a photography prohibited state is set where photographing behaviors are not performed even when a direction for taking a photograph is inputted, a predetermined region on a display screen of a transmissive display device that is provided on a light path of an optical finder device, introducing a photographic subject light entered via a photographic optical system into a finder window, and is possible to switch between a transmission state letting the photographic subject light to transmit and a low transmission state being lower in transmittance than the transmission state is put into the low transmission state. This enables easy learning of being in the photography prohibited state upon looking into the finder window.

DESCRIPTION OF THE PREFERRED EMBODIMENTS

Embodiment

Main Configuration of Imaging Apparatus

Figure 1:
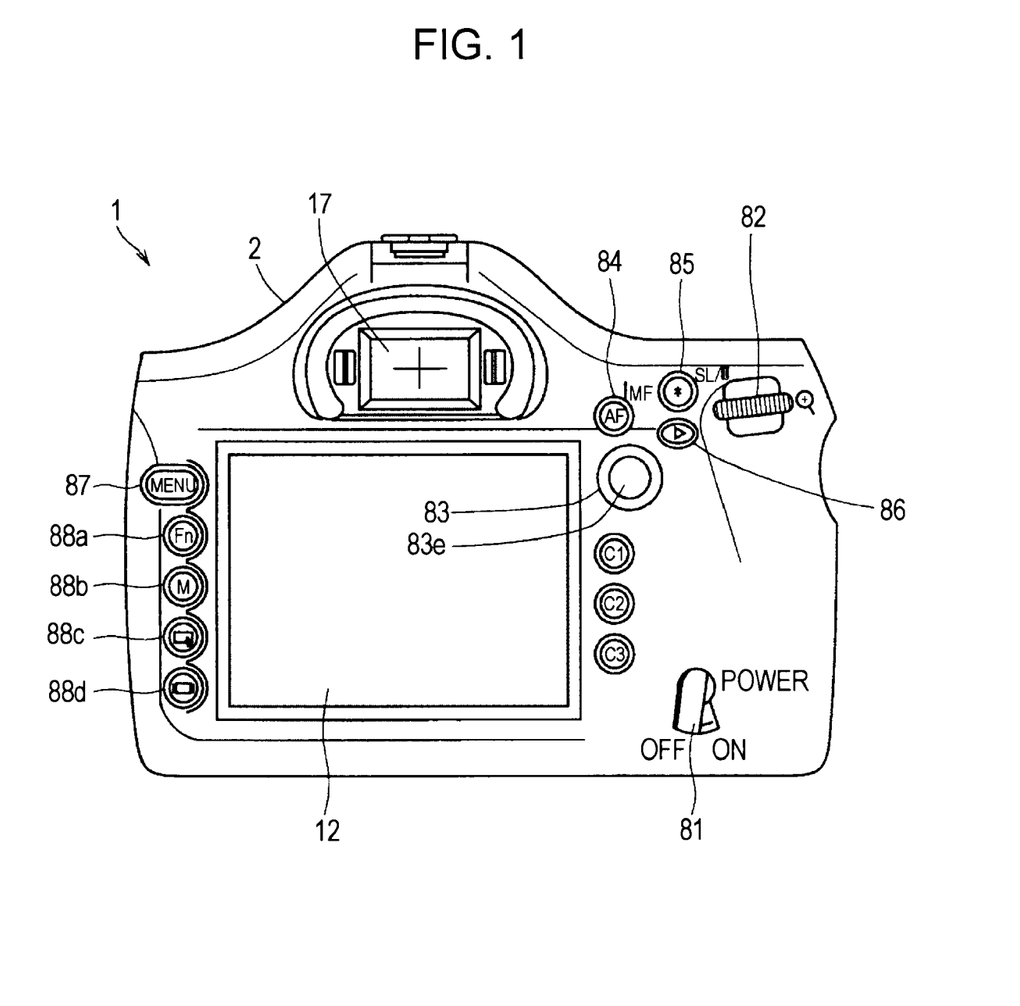
FIG. 1 is an external view of an imaging apparatus according to an embodiment of the present invention.
Figure 2:
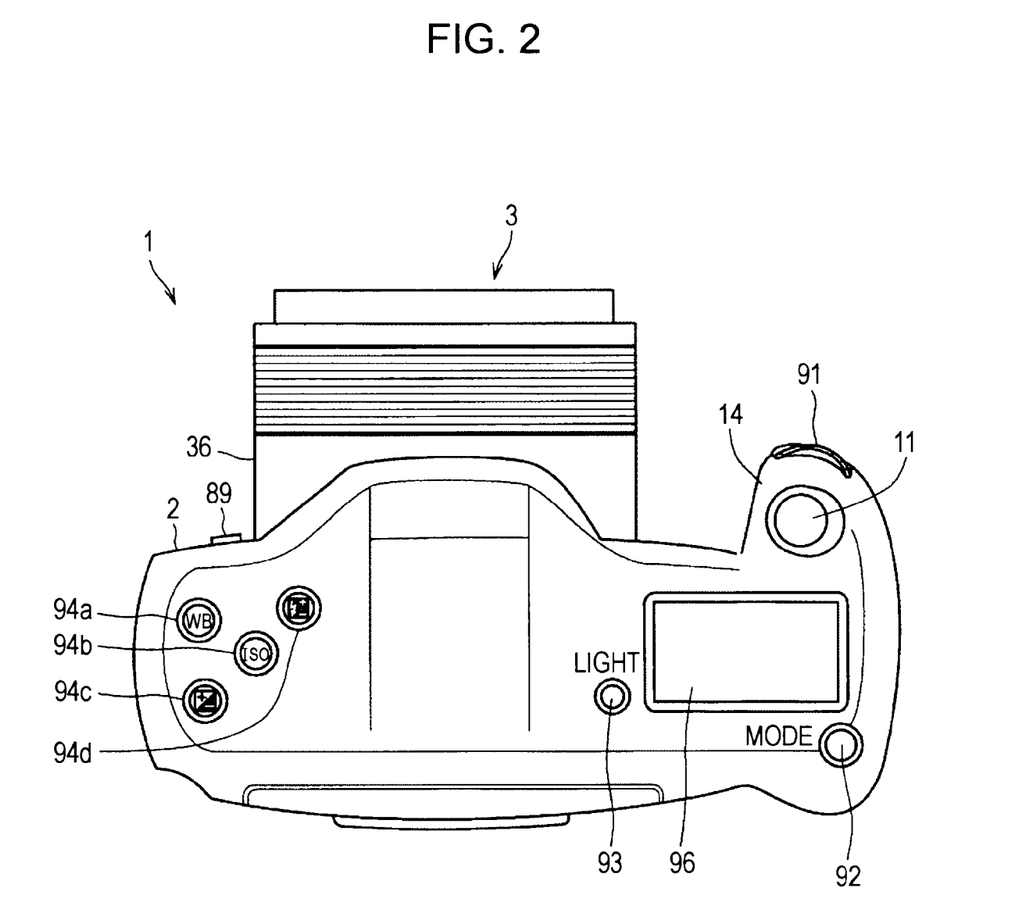
FIG. 2 is another external view of the imaging apparatus.

FIGS. 1 and 2 illustrate external configurations of an imaging apparatus 1 according to an embodiment of the present invention. FIG. 1 is a back side external view of the imaging apparatus 1, and FIG. 2 is a top external view of the imaging apparatus 1. The imaging apparatus 1 is configured as a digital camera of a single-lens reflex type with interchangeable lenses.

As illustrated in FIG. 2 and the like, the imaging apparatus 1 is provided with a camera body 2. An interchangeable photographic lens unit (interchangeable lens) 3 is removable from the camera body 2.

The photographic lens unit 3 mainly functions as a photographic optical system that is configured with a lens cone 36 in addition to a lens group, an aperture, and the like provided inside the lens cone 36. The lens group includes a focusing lens that changes a focus position by moving along the optical axis and the like.

The camera body 2 is provided with an annular mount, on which the photographic lens unit 3 is attached, approximately at the center on the front and is provided with a remove button 89 near the annular mount to attach and remove the photographic lens unit 3.

The camera body 2 is provided with a grip 14 for a user to grip at the front left end (on the right viewed from the back side). On the top fore side of the grip 14, a shutter button 11 is provided to direct to start exposure and the like. Inside the grip 14, a battery storage and a card storage are provided. A battery 9 (refer to FIG. 3) used as a power source for the camera is stored in the battery storage, and a memory card to record image data of photography images is stored removably in the card storage.

The shutter button 11 is a two-stage detection button capable of detecting two states of a half pressed state (S1 state) and a fully pressed state (S2 state). As the shutter button 11 is half pressed to be in the S1 state, preparation behaviors (such as an AF control behavior and an AE control behavior) are carried out to obtain a recorded still image (actual photography image) on a photographic subject. As the shutter button 11 is further pressed to be in the S2 state, photographing behaviors for actual photographing (a series of behaviors in which an exposure behavior relative to the photographic subject image is carried out using an imaging device 5 (refer to FIG. 3) and an image signal obtained by the exposure behavior is subjected to predetermined image processing) are carried out.

In FIG. 1, a finder window 17 is provided approximately at the upper center portion on the back side of the camera body 2. A photographic subject image from the photographic lens unit 3 is introduced into the finder window 17. A user can visually recognize the photographic subject by looking into the finder window 17. More specifically, the photographic subject image can be visually recognized by reflecting the photographic subject image passing through the photographic lens unit 3 above with a mirror mechanism 6 (refer to FIG. 3) provided inside the camera body 2 and looking the image via an eyepiece lens through a pentaprism 15 (refer to FIG. 3). In this way, a composition can be determined using the finder window 17. During actual photographing, the mirror mechanism 6 is retracted from the light path of the photographic subject image and the light from the photographic lens unit 3 reaches the imaging device 5 (refer to FIG. 3) to coincide with the timing of opening a shutter 4 (refer to FIG. 3), and thus a photography image (photography image data) according to the photographic subject is obtained.

Approximately at the center (more in detail, a position slightly to the left) on the back side of the camera body 2, a back side monitor 12 is provided. The back side monitor 12 is configured as, for example, a color liquid crystal display (LCD). The back side monitor 12 is a display capable of displaying a menu screen to set photographic conditions and the like and playback displaying photography images recorded in a memory card during a playback mode.

In the lower right portion on the back side of the camera body 2, more in detail in the lower right portion of the back side monitor 12, a power switch 81 is provided. The power switch 81 is an operation member configured as a lever switch, and the power source is turned off when a lever part of the power switch 81 is set at an OFF position on the left and the power source is turned on when the lever part is set at an ON position on the right. In other words, with the power switch 81, switching between a state of the power source being turned on, that is a state of the imaging apparatus 1 being active, and a state of the power source being turned off in which the power consumption is less than in the power-on state (low power state) can be carried out. In a case of shifted into a state of the power source being turned off in accordance with an operational input to the power switch 81, only power supply is carried out to a CPU of a controller 101 (refer to FIG. 3) desirable to maintain minimum functions (for example, acceptance of turning the power source on by the power switch 81) in the imaging apparatus 1 and is in a state of not accepting even a photographing behavior by an operation of the shutter button 11.

In the upper right portion on the back side of the camera body 2, more in detail on the right of the back side monitor 12, a multiselector 83 is provided. The multiselector 83 is an operation member of a joystick type, and is capable of detecting a respective operation with a stick portion 83e thereof tilted in four directions of left, right, top, and bottom, and is also capable of detecting a press down operation of the stick portion 83e.

In the upper right portion on the back side of the camera body 2, more in detail on the right of the back side monitor 12 and also on the top of the multiselector 83, a rear command dial 82, an AF/MF control button 84, an AE lock button 85, and a playback button 86 are provided.

The rear command dial 82 is a rotary operation member, and is capable of changing various settings in accordance with the rotational operation.

The AF/MF control button 84 is a button to accept a direction of switching between automatic focus (AF) and manual focus (MF). In a state of taking a photograph, automatic focus (AF) and manual focus (MF) are switched alternately every time this button 84 is pressed down.

The AE lock button 85 is a button to accept a direction of AE lock that fixes a state of exposure as adjusted by an automatic exposure behavior while taking a photograph.

The playback button 86 is a button to accept a direction of a change into a playback mode. As the playback button 86 is pressed down in a photographic mode, the imaging apparatus 1 is shifted into a playback mode and an already photographed image is displayed on the back side monitor 12.

On the left on the back side of the camera body 2, more in detail on the left of the back side monitor 12, a menu button 87, a function button 88a, a memory switching button 88b, an image quality adjusting button 88c, and a screen switching button 88d are provided.

The menu button 87 is a button to provide a function (call function) of displaying a menu screen. As the menu button 87 is pressed down, a menu screen having a plurality of items to carry out various settings is displayed on the back side monitor 12.

The function button 88a is a button to provide a function (call function) of displaying a submenu screen regarding some items out of the plurality of items included in the above menu screen on the back side monitor 12. For example, a menu screen for taking a photograph is displayed on the back side monitor 12 as the function button 88a is pressed down while taking a photograph, and a menu screen for playback is displayed on the back side monitor 12 as the function button 88a is pressed down during playback.

The memory switching button 88b is a button to switch recording media (memory card and the like) at a recording destination of the photography image. In the imaging apparatus 1, it is possible to load a plurality of types of memory cards in advance respectively at each predetermined position in the imaging apparatus 1. A press down operation of the memory switching button 88b or the like can preset which type of the memory cards is selected as the recording destination in a case that the plurality of types of memory cards are loaded.

The image quality adjusting button 88c is a button to selectively set the image quality (standard, fine, RAW, and the like) of a recorded image. The image quality of a recorded image is changed by switching whether or not it is compressed (JPEG compression and the like) or switching the compression rate when compression recording.

The screen switching button 88d is a button to switch whether or not photographic information is superimposed on a playback image and to switch the contents of the photographic information to be superimposed. For example, it is possible to selectively and cyclically switch, by pressing down the screen switching button 88d, among a screen displaying a playback image only, a screen indicating superimposed textual information on the playback image, and a screen indicating a superimposed histogram on the brightness on the playback image.

As illustrated in FIG. 2, on the top of the camera body 2, a mode setting button 92, a light button 93, a white balance button 94a, an ISO sensitivity button 94b, an exposure compensation button 94c, a light control adjustment button 94d, and a liquid crystal display panel 96 are provided. On the fore side of the shutter button 11, a fore command dial 91 is provided.

The fore command dial 91 is a rotary operation member and is capable of changing various settings in accordance with the rotational operation.

The mode setting button 92 is an operation member to carry out behaviors (switching behaviors) to set various modes of the camera. Every time the mode setting button 92 is pressed down, the settings are sequentially (and cyclically) changed to determine the settings. With such a press down operation of the mode setting button 92, it is possible to select a desired mode among the various photographic modes (specifically, P mode (program mode), A mode (aperture priority mode), S mode (shutter speed priority mode), M mode (manual mode), portrait mode, landscape mode, and full automation mode, and the like).

The white balance button 94a is a button to adjust the white balance, and the ISO sensitivity button 94b is a button to adjust the ISO sensitivity. The exposure compensation button 94c is a button to carry out exposure compensation that corrects the brightness of the entire image, and the light control adjustment button 94d is a button to carry out light control adjustment that adjusts the amount of light emission of the flash.

The liquid crystal display panel 96 is a display to indicate the various current settings. A backlight of the liquid crystal display panel 96 is changed to be turned on and off in accordance with a press down operation of the light button 93.

An operation of the rear command dial 82 or the fore command dial 91 enables to set control values in various photographic modes. For example, in the S mode (shutter speed priority mode), it is possible to select a desired shutter speed among possible setting values in a plurality of stages by rotationally operating the fore command dial 91. It is also possible to set an ISO sensitivity value by selecting a desired value among possible setting values in a plurality of stages by rotating the fore command dial 91 after pressing down the ISO sensitivity button 94b. Similarly, with a combination of the white balance button 94a and the fore command dial 91, a combination of the exposure compensation button 94c and the fore command dial 91, or a combination of the light control adjustment button 94d and the fore command dial 91, it is also possible to determine settings corresponding to respective buttons by a similar setting operation. As an alternative to the fore command dial 91, the rear command dial 82 can also be used to carry out similar setting operations.

Figure 3:
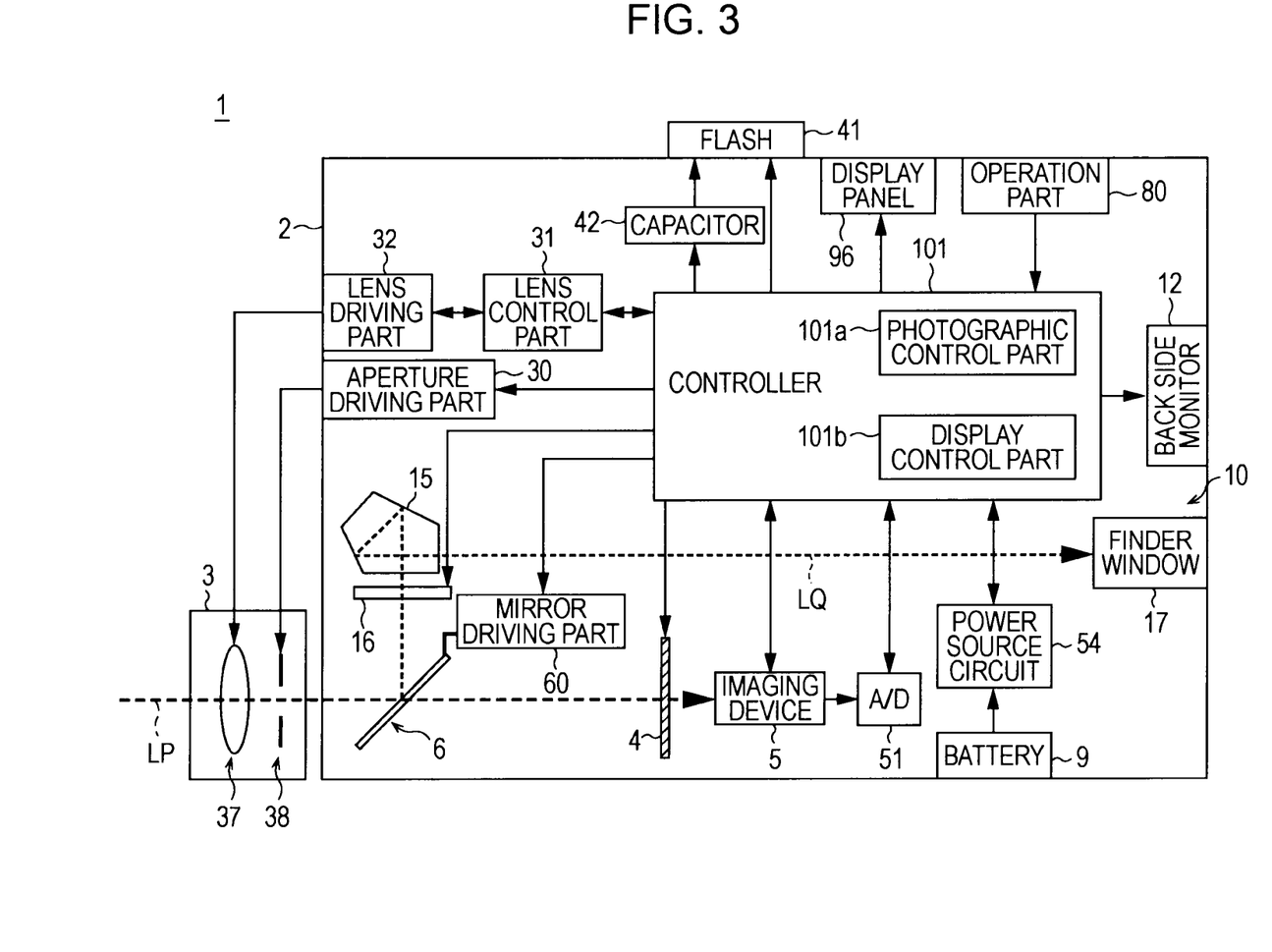
FIG. 3 is a block diagram illustrating the functional configuration of the imaging apparatus.

Next, a description is given to functional blocks of the imaging apparatus 1 with reference to FIG. 3. FIG. 3 is a block diagram illustrating a functional configuration of the imaging apparatus 1.

As illustrated in FIG. 3, the imaging apparatus 1 is provided with an operation part 80, the controller 101, a flash 41, a power source circuit 54, and the like.

The operation part 80 is configured with various buttons, switches, and the like including the shutter button 11 (refer to FIG. 2). In response to an input operation of a user to the operation part 80, the controller 101 provides various behaviors.

The controller 101 is configured as a microcomputer and is provided mainly with a CPU, a memory, a ROM, and the like. The controller 101 reads a program stored in the ROM and the program is performed in the CPU, thereby providing various functions by way of software.

The controller 101 is provided with a photographic control part 101a that controls photographing behaviors in accordance with an input of a direction for taking a photograph by a user. By the photographic control part 101a, photographing behaviors are performed to expose the imaging device 5 and generate an image signal when the shutter button 11 is fully pressed in a state of a power source of the imaging apparatus 1 being turned on, while the photography prohibited state is set not to perform the photographing behaviors even when the direction for taking a photograph is inputted by the shutter button 11 in a state of the power source being turned off.

The controller 101 carries out focusing control behaviors that send a control signal to a lens control part 31 in the camera body 2 and control the position of the focusing lens via a lens driving part 32. The controller 101 controls to switch between the states of retracting the mirror mechanism 6 from a light path LP of the photographic subject via a mirror driving part 60 (mirror up state) and blocking the light path LP with the mirror mechanism 6 (mirror down state). In the mirror down state, the photographic subject light entered via the photographic lens unit 3 is reflected above with the mirror mechanism 6 and is introduced into the finder window 17 along a light path LQ (illustrated in broken lines) of an optical finder 10 provided with the pentaprism 15. A superimposed indication that superimposes the contents indicated on a transmissive display 16 disposed below the pentaprism 15 on the photographic subject light image is enabled to be carried out in the finder window 17. The transmissive display 16 is configured as, for example, a transmissive liquid crystal panel and has a display screen that is capable of switching between a transparent state (transmission state) that transmits the photographic subject light reflected with the mirror mechanism 6 and a non-transparent state (low transmission state) that is lower in transmittance than in the transparent state. Regarding this display screen, a display control part 101b of the controller 101 controls the transmittance between the transparent state and the non-transparent state. The display contents of the transmissive display 16 are described in detail later.

The controller 101 sends a control signal to an aperture driving part 30 based on a photometric result of a photometric sensor (not shown) to adjust an open diameter (degree of openness) of an aperture 38. The controller 101 also controls opening and closing of the shutter 4 via a driving actuator (not shown).

The imaging device (a CMOS sensor, for example) 5 converts an optical image of the photographic subject into an electric signal by a photoelectric conversion action to generate an image signal according to the picked up image. The imaging device 5 exposes the photographic subject image formed on an acceptance surface in control of starting and finishing charge accumulation by the controller 101 to generate an image signal according to the photographic subject image. The image signal generated by the imaging device 5 is then inputted to an A/D (analog/digital) conversion circuit 51.

The image signal generated by the imaging device 5 is converted into digital image data (image data) by the A/D conversion circuit 51. The image data converted by the A/D conversion circuit 51 is, for example, subjected to image processing, such as γ correction, in the controller 101, and then the image is displayed on the back side monitor 12.

The flash 41 is configured as, for example, the flash of a popup type, and emits light using the power accumulated in a capacitor 42. The factors, such as whether or not the flash 41 lights up and a time period of lighting up, are controlled by the controller 101 and the like.

The power source circuit 54 is configured as a circuit to supply the power to each part of the imaging apparatus 1 including the controller 101 using the power of the battery 9.

Display Contents of Transmissive Display 16

Figure 4:
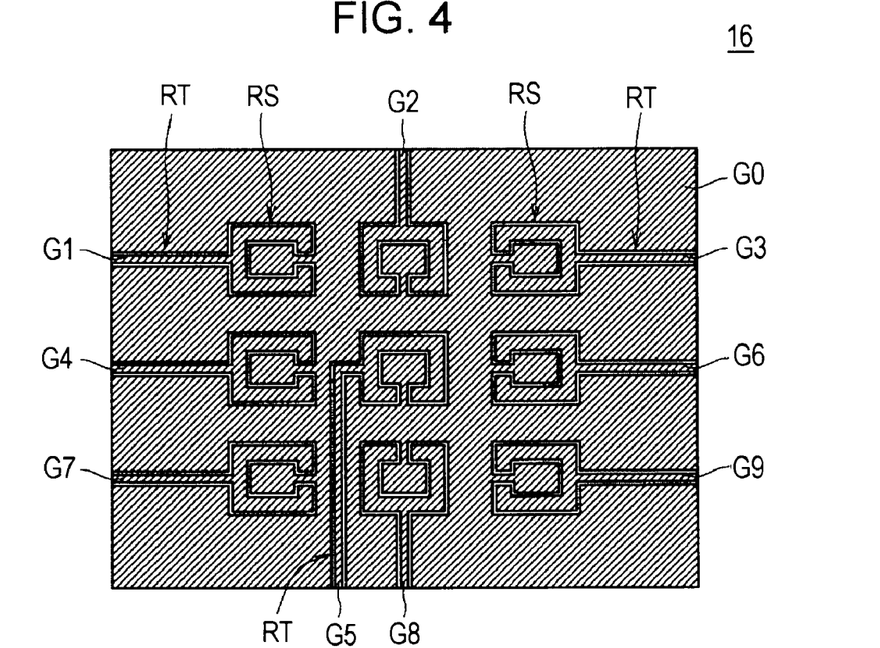
FIG. 4 is a conceptual diagram illustrating a configuration of a transmissive display.

FIG. 4 is a conceptual diagram to illustrate a configuration of the transmissive display 16.

The transmissive display 16 is provided on the light path LQ of the optical finder 10 as in FIG. 3. The transmissive display 16 is provided with ten segments G0 to G9 respectively having a predetermined area, and each of the segments G0 to G9 can change the transmittance in two-stage of a transparent state and a non-transparent state in gray. In detail, the transmissive display 16 has a structure in which a liquid crystal layer is sandwiched between a common layer spread over the entire display screen and an electrode layer with a region divided into the ten segments G0 to G9, and it is possible to switch between the transparent state and the non-transparent state for each of the segments G0 to G9 by selecting whether or not to apply a voltage to the electrode layer. Although the respective segments G1 to G9 are configured with a rectangular ring shape region RS and a linear (strip) region RT extending from the region RS to a screen end, the linear regions RT in FIG. 4 are drawn wider than the actual width for the convenience of illustration.

Figure 5:
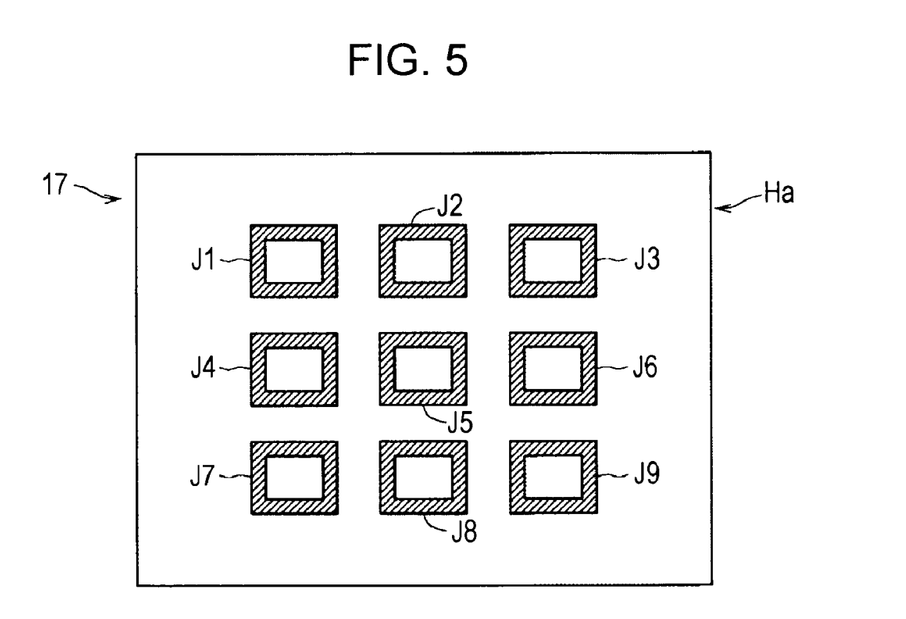
FIG. 5 illustrates a screen displayed in a finder window.

In the transmissive display 16 of such a configuration, when applying a voltage not to the segments G1 to G9 but the segment G0 only for example, it is possible to display a screen Ha showing nine AF areas (focus detection regions) J1 to J9, which correspond to the parts capable of AF by an AF sensor (not shown) in the finder window 17 as illustrated in FIG. 5.

Each of the AF areas J1 to J9 corresponds to the rectangular ring shape regions RS in the segments G1 to G9 (FIG. 4). Therefore, after completing the focusing behaviors (focus slide) by the AF control for the shutter button 11 being half pressed, it is possible to superimpose each of the AF areas J6, J8, and J9 that are focused in a main photographic subject SB, such as a person, on the photographic subject image as a screen Hb illustrated in FIG. 6, for example.

Figure 7:
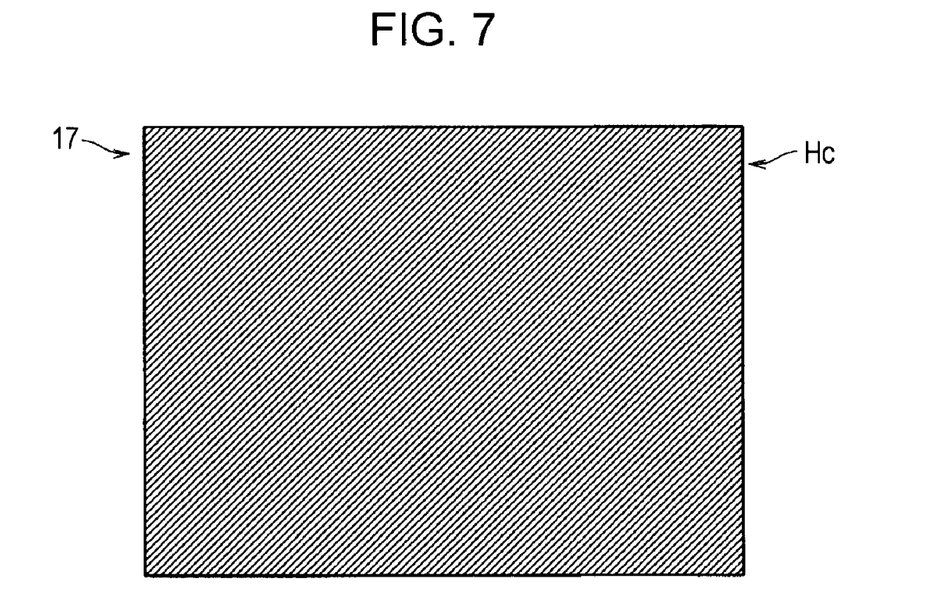
FIG. 7 illustrates another screen displayed in the finder window.

In the meanwhile, when a voltage is not applied to all the segments G0 to G9, the entire region of the screen becomes in the non-transparent state as a screen Hc illustrated in FIG. 7 to be in a state of low visual recognition of the photographic subject in the finder window 17. In the present embodiment, in a case of a state of not allowing taking a photograph even when the shutter button 11 is pressed down as the imaging apparatus 1 is shifted into a state of the power source being turned off by an operation of the power switch 81 (which may also be referred to below as a photography prohibited state), the screen Hc illustrated in FIG. 7 is displayed in the finder window 17. With that, the screen Hc (FIG. 7) difficult to confirm the photographic subject upon looking into the finder window 17 becomes visually recognized, so that a user can intuitively learn that the imaging apparatus 1 is in the photography prohibited state. By putting a screen region including the entire region that can be visually recognized in the finder window 17 on the display screen of the transmissive display 16 into the non-transparent state, it is possible to display the screen Hc illustrated in FIG. 7 in the finder window 17.

A detailed description is given below to specific behaviors of the imaging apparatus 1.

Behaviors of Imaging Apparatus 1

Figure 8:
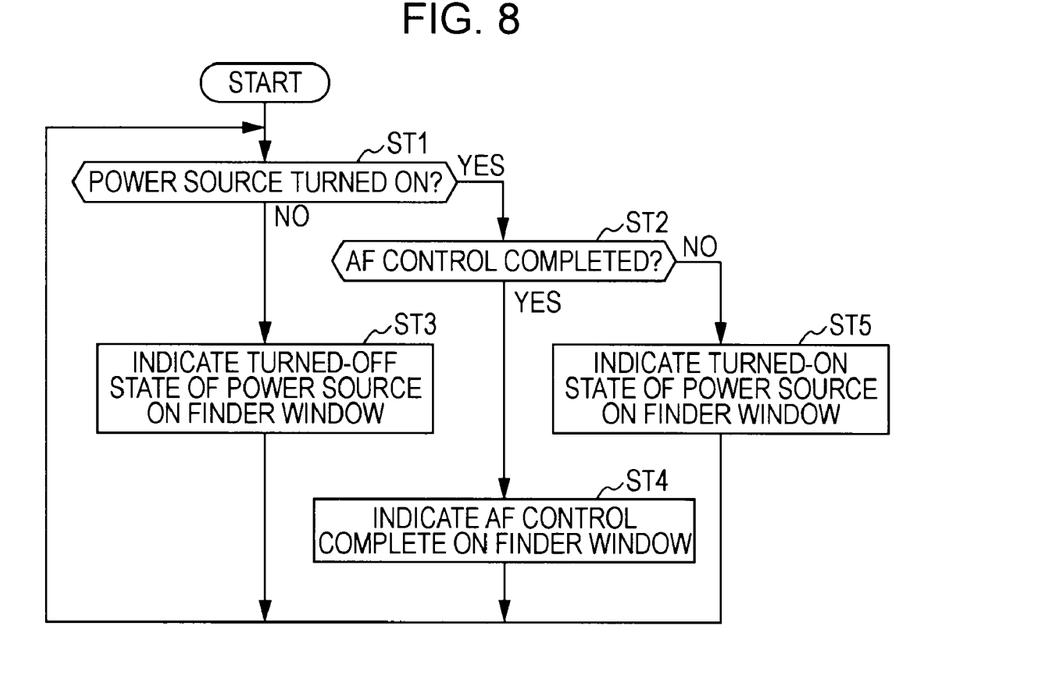
FIG. 8 is a flowchart showing basic behaviors of the imaging apparatus.

FIG. 8 is a flowchart showing basic behaviors of the imaging apparatus 1. The behaviors are performed by the controller 101.

In step ST1, whether or not the power source is turned on in the imaging apparatus 1 is determined. Specifically, whether or not the lever part of the power switch 81 (FIG. 1) is set at the ON position is evaluated. Here, the process proceeds to step ST2 in case of the power source being turned on, and the process proceeds to step ST3 in case of the power source not being turned on but turned off.

In step ST2, whether or not the AF control is completed is determined. Specifically, whether or not the focus slide (focusing control) started by the shutter button 11 being half pressed is finished is evaluated. Here, the process proceeds to step ST4 in a case of the AF control being completed, and the process proceeds to step ST5 in a case of not being completed.

In step ST3, an indication that the power source of the imaging apparatus 1 is turned off is carried out in the finder window 17. Specifically, the screen Hc (FIG. 7) in which the photographic subject is difficult to be visually recognized as the entire region is in the non-transparent state is indicated in the finder window 17 with the transmissive display 16. With that, a user looking into the finder window 17 for trying to take a photograph can be easily aware that the imaging apparatus 1 is in the state of the power source being turned off and in the photography prohibited state. In addition, since no voltage is requested to be applied to the transmissive display 16 for indicating the screen Hc illustrated in FIG. 7, it becomes possible to save the power in a state of the power source being turned off.

Figure 6:
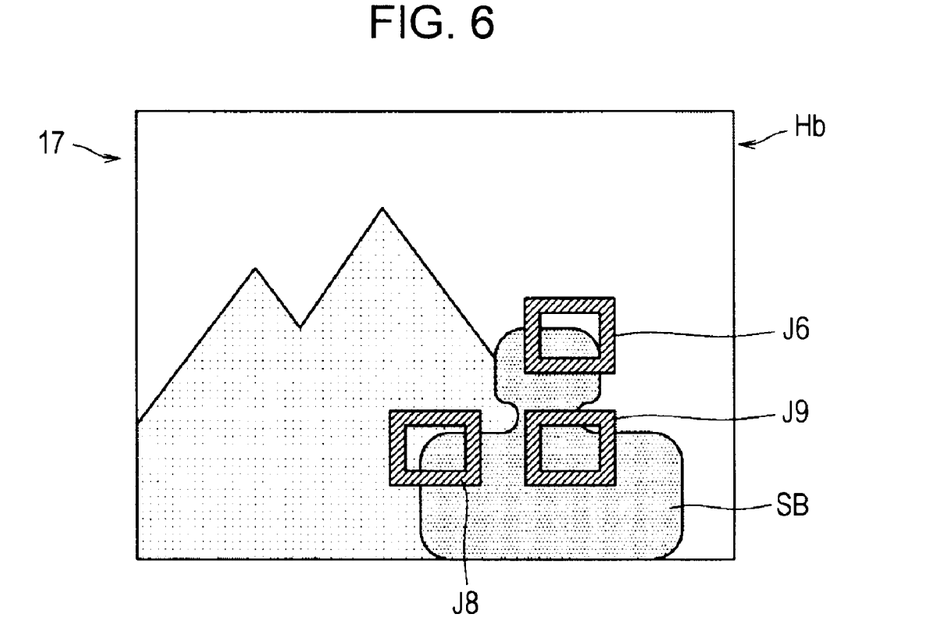
FIG. 6 illustrates another screen displayed in the finder window.

In step ST4, an indication that the AF control is completed is carried out in the finder window 17. Specifically, as illustrated in FIG. 6, the screen Hb in which each of the focused AF areas J6, J8, and J9 are superimposed on the photographic subject image is indicated in the finder window 17 with the transmissive display 16. This enables to inform the user looking into the finder window 17 of the focused parts in the photographic subject.

Figure 9:
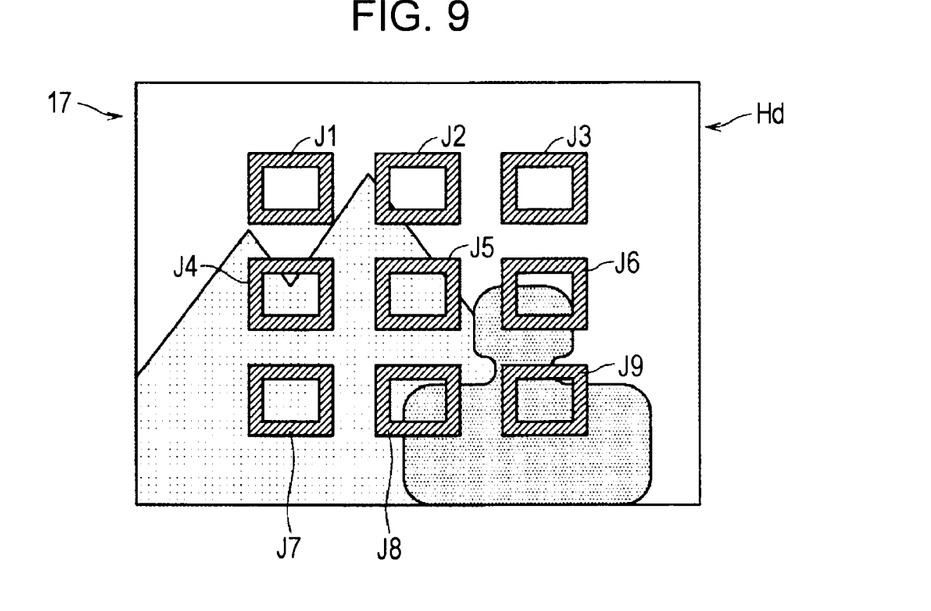
FIG. 9 illustrates another screen displayed in the finder window.

In step ST5, an indication that the power source of the imaging apparatus 1 is turned on is carried out in the finder window 17. Specifically, as illustrated in FIG. 9, a screen Hd in which the AF areas J1 to J9 are superimposed on the photographic subject image is indicated in the finder window 17 with the transmissive display 16. This enables to inform the user looking into the finder window 17 of the positions of nine AF areas J1 to J9 capable of focusing.

Due to the behaviors of the imaging apparatus 1 as above, in a case of being set in the state of the power source being turned off (low power state) and in the photography prohibited state, the display screen of the transmissive display 16 is put into the non-transparent state to display the screen Hc illustrated in FIG. 7 in the finder window 17, so that the user can easily learn that the apparatus is in the photography prohibited state upon looking into the finder window 17.

Figure 10:
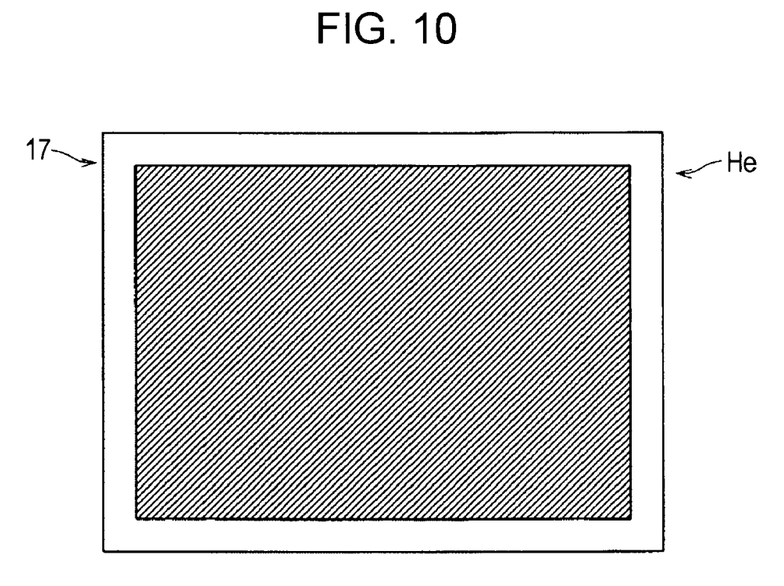
FIG. 10 illustrates another screen displayed in the finder window.
Figure 11:
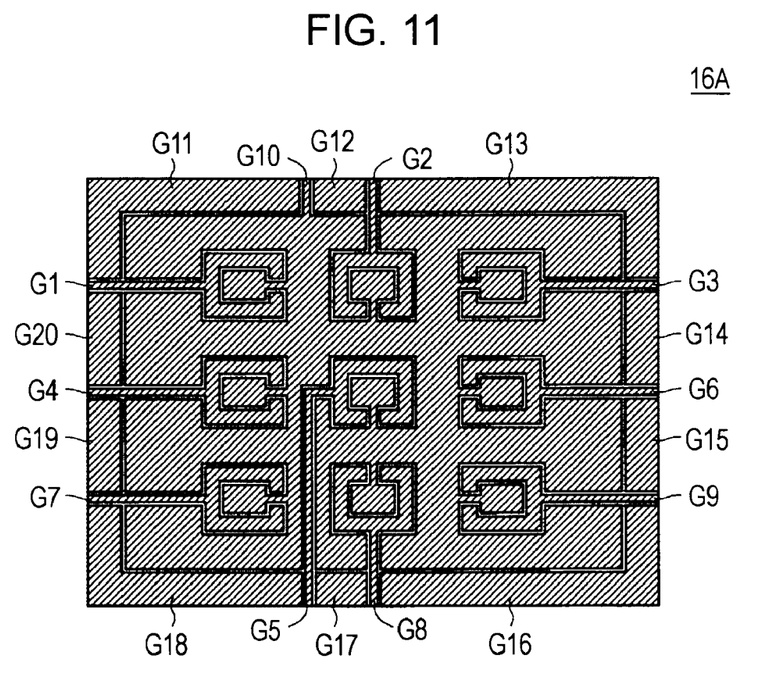
FIG. 11 is a conceptual diagram illustrating another configuration of the transmissive display.

In the imaging apparatus 1, in the photography prohibited state while the power source is turned off, the entire region of the screen to display the photographic subject image in the finder window 17 may be put into the non-transparent state as the screen Hc illustrated in FIG. 7, while end portions of the screen may also be put into the transparent state and the majority of the screen region may also be put into the non-transparent state as a screen He illustrated in FIG. 10. In this case, by employing a transmissive display 16A in which, for example, left, right, top, and bottom edges of the screen are separated from the segment G0 (FIG. 4) as illustrated in FIG. 11 and by applying a voltage to segments G11 to G20, it is possible to display the screen He illustrated in FIG. 10 in the finder window 17. With such screen He, it is also possible to let a user looking into the finder window 17 easily recognize that the imaging apparatus 1 is in the photography prohibited state.

In a case that the imaging apparatus 1 is provided with a power saving function (power saving mode) intending to save the electric power, the screen Hc (FIG. 7), which is in the non-transparent state difficult to visually recognize the photographic subject, may also be displayed in the finder window 17 when put into the photography prohibited state by being shifted into the power saving state. That is, in a case of being set in the photography prohibited state due to shift to the power saving state (low power state) when an operational input is not carried out to the operation part 80 for a certain period of time in the imaging apparatus 1 with the power source being turned on, the screen Hc illustrated in FIG. 7 is arranged to be displayed in the finder window 17. In a case of performing controls in two phases that are different in accordance with the time passed after shifted into the power saving mode, for example, a first phase control that accepts an input of a direction for taking a photograph by the shutter button 11 before a predetermined time period a passes and a second phase control that does not accept an input of a direction for taking a photograph after the above time period a passes, the screen Hc illustrated in FIG. 7 is arranged to be displayed after the second phase control is started to be in the photography prohibited state.

Modifications

The transmissive display in the above embodiment may employ the type that shifts from the non-transparent state into the transparent state by voltage application, while it may also employ a type that shifts from the transparent state into the non-transparent state. In this case, although a certain power is consumed to display the screen Hc illustrated in FIG. 7 while the power source is turned off, it is possible to let a user looking into the finder window 17 intuitively recognize that it is in the photography prohibited state similar to the embodiment described above.

The transmissive display in the above embodiment may employ the type capable of changing the transmittance in two stages, while it may also employ a type capable of changing the transmittance in three stages or more or even continuously. In this case, it is also possible to appropriately inform a user of the apparatus being in the photography prohibited state by putting the transmissive display into a state of lower in light transmittance (low transmission state) compared with the transparent state, which is set while the imaging apparatus is used normally (active state of the imaging apparatus) during the photography prohibited state while the power source is turned off.

The imaging apparatus in the above embodiment may be configured as a digital camera, while it may also be configured as a film camera using silver halide films.

The present application contains subject matter related to that disclosed in Japanese Priority Patent Application JP 2009-096986 filed in the Japan Patent Office on Apr. 13, 2009, the entire content of which is hereby incorporated by reference.

Although a detailed description is given to embodiments of the present invention, the above description is for illustration in all meanings and embodiments of the present invention are not limited to this. It is understood that there may be numerous modifications not illustrated herein may be assumed without departing from the scope of the present invention.

What is claimed is:

1. An imaging apparatus, comprising:
   photographic control means for controlling a photographing behavior in accordance with an input of a direction for taking a photograph;
   switching means for switching between an active state of the imaging apparatus and a low power state lower in power consumption than the active state;
   optical finder means for introducing a photographic subject light entered via a photographic optical system into a finder window along a predetermined light path;
   transmissive display means provided on the predetermined light path and having a display screen capable of switching between a transmission state that transmits the photographic subject light and a low transmission state lower in transmittance than in the transmission state; and
   display control means for controlling the transmittance of the display screen between the transmission state and the low transmission state;
   wherein the photographic control means has photography prohibition means for setting in a photography prohibited state in which the photographing behavior is not performed even when the direction for taking the photograph is inputted; and
   wherein the display control means has means for putting a predetermined region in the display screen into the low transmission state in a case that the photography prohibited state is set in the low power state.

2. The imaging apparatus according to claim 1, further comprising:
   means for shifting the imaging apparatus into a state of a power source being turned off in accordance with an operational input to a predetermined operation member;
   wherein the low power state is the state of the power source being turned off.

3. The imaging apparatus according to claim 1, further comprising:
means for shifting the imaging apparatus into a power saving state in a case that an operational input to the imaging apparatus is not carried out for a certain period of time;
wherein the low power state is the power saving state.

4. The imaging apparatus according to claim 1, wherein the predetermined region includes an entire region on the display screen possible to be visually recognized in the finder window.

5. A display control method, comprising the steps of:
controlling a photographing behavior in an imaging apparatus in accordance with an input of a direction for taking a photograph;
switching between an active state of the imaging apparatus and a low power state lower in power consumption than in the active state; and
controlling a display screen of transmissive display means, which is provided on a light path of optical finder means for introducing a photographic subject light entered via a photographic optical system into a finder window and is capable of switching between a transmission state that transmits the photographic subject light and a low transmission state lower in transmittance than in the transmission state, regarding the transmittance between the transmission state and the low transmission state;
wherein the photographic controlling has a step of prohibiting photography that sets in a photography prohibited state in which the photographing behavior is not performed even when the direction for taking the photograph is inputted; and
wherein the display controlling has a step of putting a predetermined region in the display screen into the low transmission state in a case of setting in the photography prohibited state in the low power state.

6. An imaging apparatus, comprising:
a photographic control device controlling a photographing behavior in accordance with an input of a direction for taking a photograph;
a switching device switching between an active state of the imaging apparatus and a low power state lower in power consumption than the active state;
an optical finder device introducing a photographic subject light entered via a photographic optical system into a finder window along a predetermined light path;
a transmissive display device provided on the predetermined light path and having a display screen capable of switching between a transmission state that transmits the photographic subject light and a low transmission state lower in transmittance than in the transmission state; and
a display control device controlling the transmittance of the display screen between the transmission state and the low transmission state;
wherein the photographic control device has a photography prohibition device setting in a photography prohibited state in which the photographing behavior is not performed even when the direction for taking the photograph is inputted; and
wherein the display control device has a device putting a predetermined region in the display screen into the low transmission state in a case that the photography prohibited state is set in the low power state.

* * * * *